UNITED STATES PATENT OFFICE.

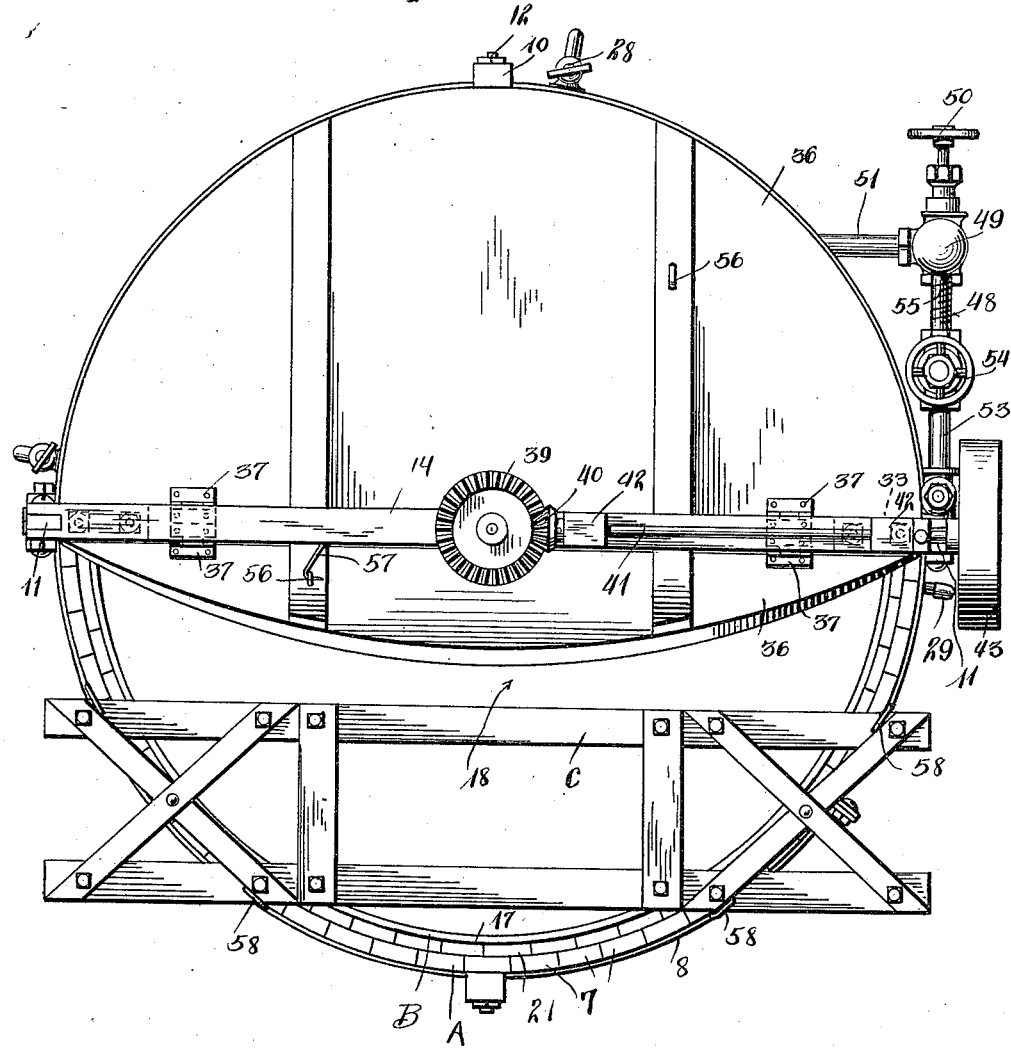

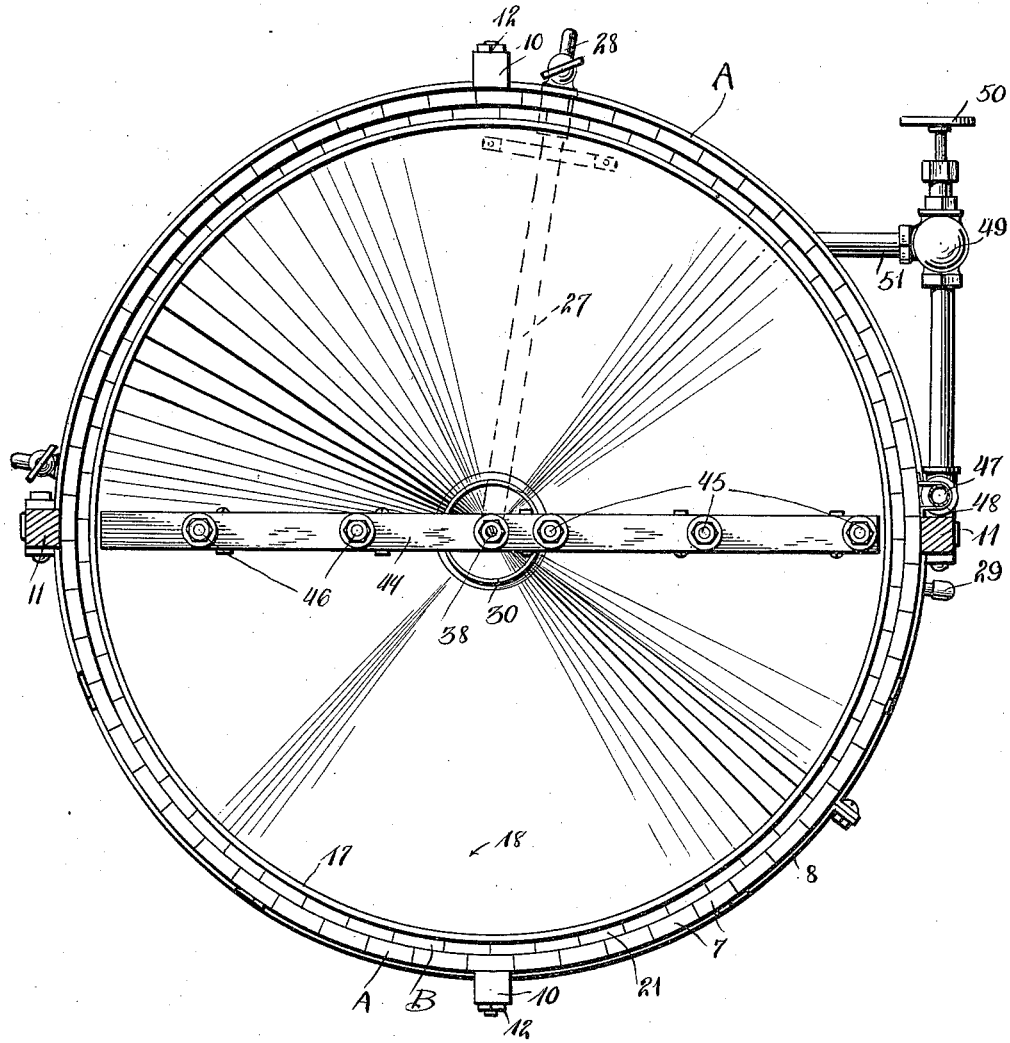

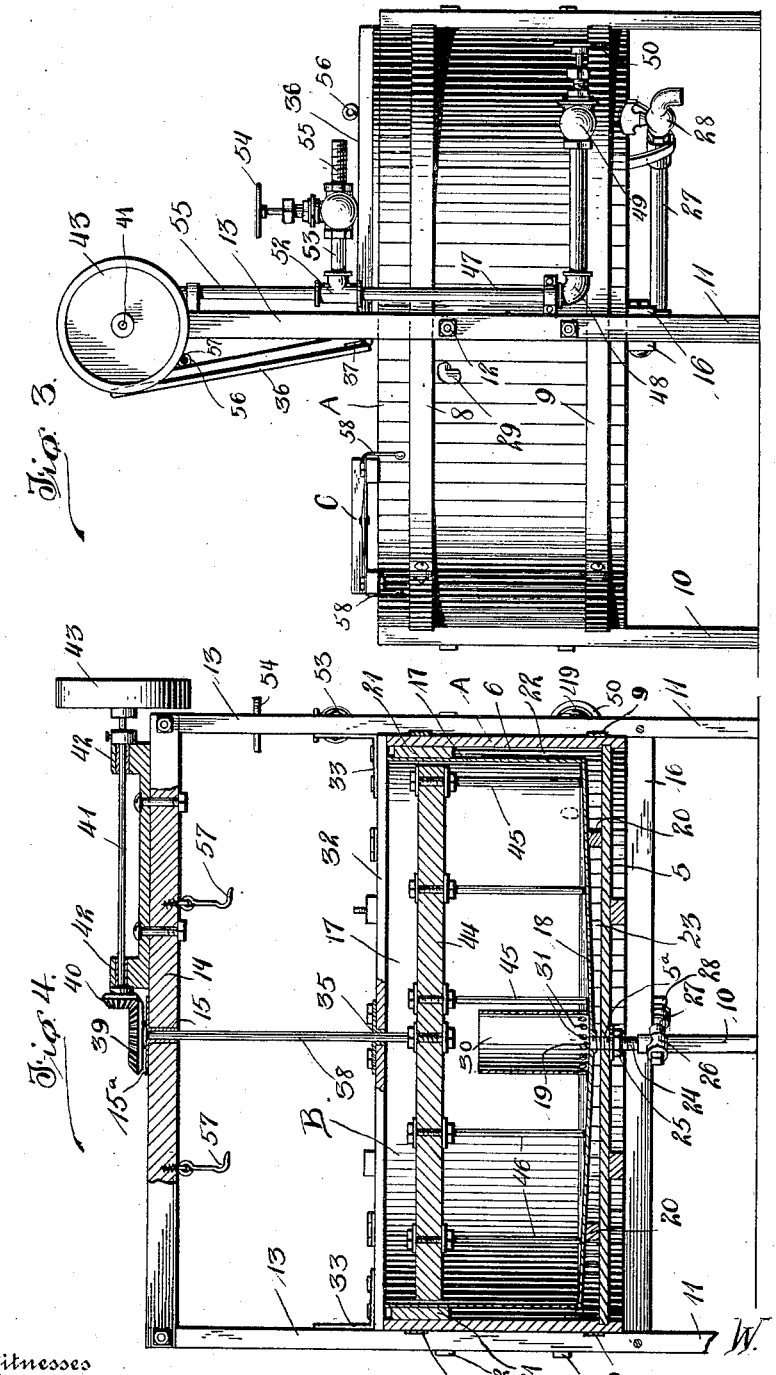

WILLIAM BEHM, OF MADISON, WISCONSIN.

CHEESE-MAKING MACHINE.

1,044,851.  Specification of Letters Patent.  Patented Nov. 19, 1912.

Application filed January 11, 1912. Serial No. 670,643.

*To all whom it may concern:*

Be it known that I, WILLIAM BEHM, a citizen of the United States, residing at Madison, in the county of Dane, State of Wisconsin, have invented certain new and useful Improvements in Cheese-Making Machines; and I do hereby declare the following to be a full, clear, and exact description of the invention, such as will enable others skilled in the art to which it appertains to make and use the same.

This invention relates to improvements in cheese making machines.

The principal object of this invention is to provide a machine for separating the salt water and whey from the curd previous to the milling operation.

Another object of the invention is to provide a machine for the purpose described in which the salt water and whey is cooled by gravity and carried off.

A further object of the invention is to provide a machine for the purpose described which includes a curd container, a novel form of agitating means associated therewith, an outlet associated with the container for the salt water and whey, and a heating means for the container, whereby the temperature of the curd may be regulated as desired.

A still further object of the invention is to provide a novel piping arrangement in connection with the heating means for the container, whereby a hose may be readily attached for permitting the hot water to be used for either rinsing the curd or for cleaning the container.

A still further object of the invention is to provide a machine of the character described which is composed of a relatively few number of parts, is therefore simple in construction, and is cheap to manufacture.

With these and other objects in view, the invention consists in the construction and novel combination of parts hereinafter fully described, illustrated in the accompanying drawings, and pointed out in the claim hereto appended; it being understood that various changes in the form, proportion, size and minor details of construction within the scope of the claim, may be resorted to without departing from the spirit or sacrificing any of the advantages of the invention.

In the drawings: Figure 1 is a top plan view of my invention showing one of the closures open, Fig. 2 is a similar view but showing the closures and operating mechanism removed, Fig. 3 is a side elevation of Fig. 1, and Fig. 4 is a vertical sectional view through such a machine.

Like reference numerals designate corresponding parts in all the figures of the drawings.

Referring to the drawings, the invention comprises a receptacle A which includes a bottom 5 having a central opening 5ª formed therein and a circular wall 6, said wall being formed from a plurality of staves 7. These staves are held together by upper and lower split hoops 8 and 9 respectively of any preferred construction. In order to support the receptacle above the floor, there is provided diametrically opposed pairs of supporting legs 10—10 and 11—11 respectively. These legs are secured to the exterior face of the wall 6 by means of bolts 12 or other suitable fastening means. The legs 11—11 extend above the wall 6 to form standards 13—13. A cross bar 14 is connected at its ends to the upper ends of the standards 13 by means of bolts or other suitable fastening means. This cross bar is centrally formed with a vertical opening 15 adapted for a purpose herinafter to be described. A bearing 15ª is secured to the bar, and is co-axial with the opening 15 thereof. Secured to the legs 11 directly below the bottom 6 of the receptacle is a pair of spaced cross bars 16—16.

Disposed within the receptacle A is a curd container B. This container is preferably formed of sheet metal, and includes a circular wall 17 which is spaced from the wall 6 of the receptacle, and a bottom 18, the latter being downwardly inclined from the wall to the center, said center being formed with an opening 19 which registers with the opening 5ª of the bottom 5 of the receptacle. The bottom 18 is disposed in spaced relation to the bottom 5 of the receptacle by means of spaced blocks 20, said blocks also serving to support the container. A packing ring 21 is disposed between the upper ends of the walls of the receptacle and container, and forms a tight connection therebetween. As a result of this construction, there is provided an annular space 22 between the walls of the receptacle and container, and a space 23 between the bottoms of the receptacle and container. An outlet pipe 24 is disposed within the opening 5ª of the bottom of the receptacle, and has its upper end secured to the bottom 18 of the container around the opening 19 thereof. The lower end of this pipe projects below the bottom of the receptacle, and is threaded for engagement with a nut 25, said nut serving to hold the container against upward movement. Secured to the lower end of the pipe 24 below the nut 25 is a T 26 to which is attached one end of a laterally extending pipe 27, a spigot 28 being attached to the other end of said pipe. An overflow pipe 29 has one end engaged within an opening formed in the walls 6 of the receptacle, and this pipe communicates with the annular space 22 above described.

A cylindrical guard 30 of sheet metal having a diameter considerably greater than the diameter of the opening 19 of the container, has its lower end outwardly flanged and secured to the bottom 18 of said container around said opening 19. The upper end of the guard is disposed below the upper edge of the wall of the container. Formed in the lower portion of the guard in close proximity to the attaching flange is an annular series of small perforations 31, the lower portions of the perforations being disposed in the same plane as the upper face of the attaching flange of said guard.

A cross bar 32 is disposed intermediate the standards 13 of the legs 11, and the ends of said bar rest upon the upper edge of the wall 6 of the receptacle. Angle-brackets 33—33 are employed to fixedly secure said bar to the respective standards. This cross bar is centrally formed with an opening, and centrally secured to the upper face of said bar is a bar 35. Opposed closures 36—36 are connected to the bar 32 by means of hinges 37 for permitting of said closures to swing upwardly when it is desired to gain access to the container.

A vertically disposed agitator shaft 38 is journaled within the bearings 15ª of the cross bar 14 and the bearing 35 of the cross bar 32. The upper end of this shaft projects above the bearing 35, and fixedly secured thereon is a bevel gear 39 which is engaged by a bevel pinion 40 fixedly mounted upon a horizontal shaft 41 journaled in bearings 42—42 carried by the cross bar 14. A pulley 43 is secured to the outer end of the shaft 41, and is adapted to be driven by a motor (not shown).

The lower end of the shaft 38 is centrally connected to a horizontally disposed rotatable agitator bar 44, said shaft and bar being fixedly connected to rotate one with the other. Secured to the bar 44 on one side of the shaft 38 is a plurality of downwardly extending agitator fingers 45, said fingers being spaced equal distances apart. Secured to the other side of the agitator bar 44 is a plurality of downwardly extending fingers 46, these fingers being secured to the bar in such positions as to respectively follow the first mentioned fingers between a respective pair thereof. Thus it will be observed that as the bar 44 rotates all of the fingers will follow a circular path of its own.

Supported exteriorly by the wall 6 of the receptacle is a vertical hot water pipe 47, the lower end thereof being connected by means of a coupling to a horizontal section 48 which in turn is connected to a valve coupling 49, said coupling being provided with a usual hand-valve 50. Projecting from the coupling is a short lateral pipe 51, the other end thereof projecting into a suitable opening formed in the wall 6 of the receptacle and communicating with the bottom of the annular space 22 above described. Connected to the upper end of the vertical pipe 47 is a T 52, and connected to the lateral stem thereof is one end of a pipe 53, said pipe having a valve 54 associated therewith. Connected to the opposite end of the T 52 is a pipe section 55 adapted to be connected with a feed water pipe (not shown). Eyes 56 are connected to the closures 36, and are adapted to be engaged by hooks 57 carried by the cross bar 14 when it is desired to hold either or both of said closures in an elevated position.

In practice, a support, indicated as a whole by the reference letter C, is positioned upon the receptacle, and is secured against displacement by means of hooks 58. A curd mill (not shown) is adapted to be positioned upon the support and the curds to be acted upon readily fall into the container B. The agitator bar is rotated by the gear above described, and as a result, the agitator fingers 45 and 46 will keep the curd in a continuously agitated condition. It will be observed that by the arrangement of the teeth it will be impossible for the curd to congeal. As a result of the rotation of this agitator, the salt water and the whey will be caused to become separated from the curd, and on account of the inclined bottom 5 of the receptacle, the salt water and whey will by gravity be directed toward the guard 30. This salt water and whey will thence pass through the perforations 31 of said guard and through the opening 19 of the bottom of the container and thence through the outlet pipe 24. The agitator bar is kept in motion a sufficient length of time to permit of all of said salt water and whey to be separated from the curd. Should it be desired to raise the temperature of the curd to assist in this work, more or less hot water can be directed into the spaces 22 and 23 between the container and receptacle, as will be readily understood from the description of the pipes heretofore. It will of course be understood that when water is thus being directed, the valve 54 will be closed and the hand valve 50 will be opened. This hot water will have a continuous passage, and will overflow through the overflow pipe 29. Should it be desired to rinse the curd, or to wash the container after the above operation, a hose (not shown) may be attached to the lateral pipe section 53. It will be understood that when this hose is being used, the hand valve 50 will be closed and the valve 54 will be opened.

What is claimed is:

In a cheese making machine, the combination with a receptacle including a cylindrical wall and bottom, of a curd container disposed within the receptacle, said container including a circular wall and a bottom which inclines downwardly to the center, said walls and bottoms being disposed in spaced relation to form a hot water chamber, the bottom of the container being centrally formed with an outlet for the salt water and whey, a packing ring disposed between the upper portions of the walls of the receptacle and container, a perforated cylindrical guard for the outlet secured to the bottom of the container, and a curd agitating mechanism for the container.

In testimony whereof, I affix my signature, in presence of witnesses.

WILLIAM BEHM.

Witnesses:
C. E. BLAKE,
A. T. BRUHN,
OSCAR KNUDSON.

---

Copies of this patent may be obtained for five cents each, by addressing the "Commissioner of Patents, Washington, D. C."